US008290825B1

(12) United States Patent
Harris (10) Patent No.: US 8,290,825 B1
(45) Date of Patent: Oct. 16, 2012

(54) AUCTION SYSTEM WITH CREDIT INFORMATION

(75) Inventor: Scott C. Harris, Rancho Santa Fe, CA (US)

(73) Assignee: Harris Technology, Inc., Rancho Santa Fe, CA (US)

( * ) Notice: Subject to any disclaimer, the term of this patent is extended or adjusted under 35 U.S.C. 154(b) by 987 days.

(21) Appl. No.: 11/841,667

(22) Filed: Aug. 20, 2007

Related U.S. Application Data

(63) Continuation of application No. 09/669,805, filed on Sep. 26, 2000, now Pat. No. 8,170,924.

(60) Provisional application No. 60/169,728, filed on Dec. 8, 1999.

(51) Int. Cl.
*G06Q 30/00* (2012.01)
(52) U.S. Cl. ...................................................... 705/26.3
(58) Field of Classification Search .............. 705/26, 705/27, 26.3, 27.1, 27.2
See application file for complete search history.

(56) References Cited

U.S. PATENT DOCUMENTS

| 5,897,620 A | * | 4/1999 | Walker et al. ............... 705/5 |
| 5,950,172 A | * | 9/1999 | Klingman ..................... 705/27.1 |
| 6,230,146 B1 | * | 5/2001 | Alaia et al. .................. 705/37 |
| 2002/0055899 A1 | * | 5/2002 | Williams ...................... 705/37 |
| 2002/0138390 A1 | * | 9/2002 | May ............................ 705/37 |

FOREIGN PATENT DOCUMENTS

WO    WO-0065505 A2 * 11/2000

OTHER PUBLICATIONS

Nuttall, N., "Sotheby's in electronic Bidding Plan; Transatlantic Auctions," Times of London, Home News section, Nov. 14, 1989.*
Molnar, L., "Selling to the State: More Than Ever, State Government Is a Viable Market for Small Business," Business Journal of New Jersey, vol. 8, No. 11, p. 25, Jul. 1991.*
Anon., "Onsale: Onsale Brings Thrill of Auctions and Bargain Hunting Online; Unique Internet Retail Service Debuts with Week-Long Charity Auction for the Computer Museum in Boston," Business Wire, May 24, 1995.*
Anon., "PR PROSE MORTGAGEAUCTION.COM: MortgageAuction.com Revolutionizes Mortgage Industry by Launching the Nation's First Real-time, Online Home Financing Auction," Business Wire, Nov. 16, 1998.*

* cited by examiner

*Primary Examiner* — Nicholas D Rosen
(74) *Attorney, Agent, or Firm* — Law Office of Scott C. Harris, Inc.

(57) ABSTRACT

An Internet-based auction of items for sale is hosted in a server computer. Different members who want to participate in the Internet-based auction establish credit information. That credit information is shown to other users in the auction. The credit information for example can be shown as colors or the like.

8 Claims, 7 Drawing Sheets

AUCTION SYSTEM WITH CREDIT INFORMATION

CROSS REFERENCE TO RELATED APPLICATIONS

This application claims the benefit of the U.S. Provisional Application No. 60/169,728 filed on Dec. 8, 1999.

BACKGROUND

The present invention describes a new paradigm for conducting an auction on a remote information server such as the Internet.

The Internet is an extremely powerful tool for conducting auctions. Literally millions of users can simultaneously take part in a single auction. Auction sites such as E-bay have popularized the Internet auctions. Each of these auctions allows bidding between virtually every person who has access to the Internet.

The auctions often last over an extended period of time, e.g. over one week. Many of these auctions use agents which automatically handle the bidding. The bidder instructs the agent with information about the bidder's maximum desired bid. The agent will bid only up to that amount. Moreover, the agent does not immediately bid its maximum amount; it only bids an amount when the price of the item rises to a level that forces the agent to bid in order to keep the high bid.

It has been found that the most serious and competitive bidding can occur at the end of the auction. Conversely, bidding early in the auction tends to cause the product to sell for more money than it would have sold for otherwise. Therefore, people often wait until the last instant, e.g. the last minutes or seconds of the auction, before bidding.

Auction sites such as E-bay often have fixed times for the auction ending. The auction ends at that moment, even if bidding may be most intense at that moment. If a bid is placed, but not received before the instant of the auction end, the item will sell. Therefore, Internet delays can cause a product to sell for less money than it otherwise would have sold for.

SUMMARY

The present invention recognizes that the standard model of Internet auctions is actually flawed. Auctions should be carried out more like a real live auction. While live auctions are known in the Internet art, a different kind of live auction is described herein. This live auction includes certain refinements which improve it for use on the Internet.

This includes an identification system with each of a plurality of bidders being identifiable.

Another aspect includes a combination of an on-line auction and off-line auction, with the off-line auction forming effectively a display period for the merchandise during which the users can place bids, and the on-line auction forming a final bidding period for the goods during which the goods are actually sold.

Another aspect is an agent for use in an online auction, in which not only the amounts of the bids, but also the time when those amounts are release, are specified.

BRIEF DESCRIPTION OF THE DRAWINGS

These and other aspects will now be described in detail with respect to the accompanying drawings, wherein:

FIGS. 6A and 6B show flowcharts of operation; and

DETAILED DESCRIPTION

Figure 1:
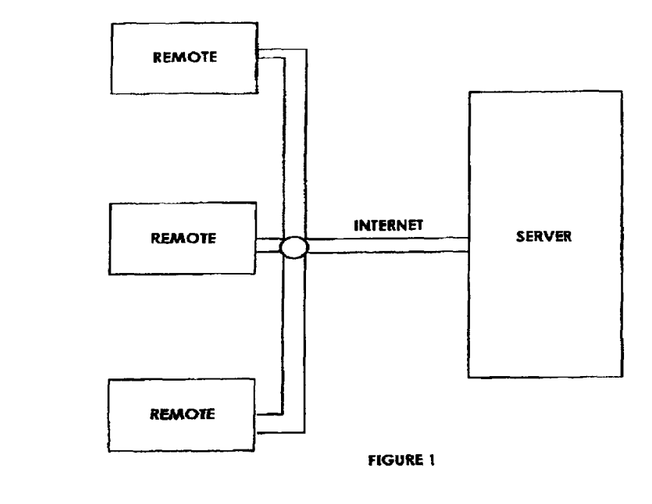
FIG. 1 shows a block diagram of the hardware used by the bidding system of the first embodiment.

FIG. 1 shows a basic structure of a first embodiment of the bidding system. The bidding is actually carried out within a virtual environment created by the central "server" computer 100. The server may be more than one computer, which operate to execute a program as described herein.

Server 100 keeps track of all the bids, and produces the graphical environment that is displayed on each of the remote terminals, where only three remote terminals: 110, 120 and 130; are shown. Literally every computer on the Internet could be included. Each of the remote terminals preferably obtains a view that is partly the same as the others, and partly different.

Figure 2:
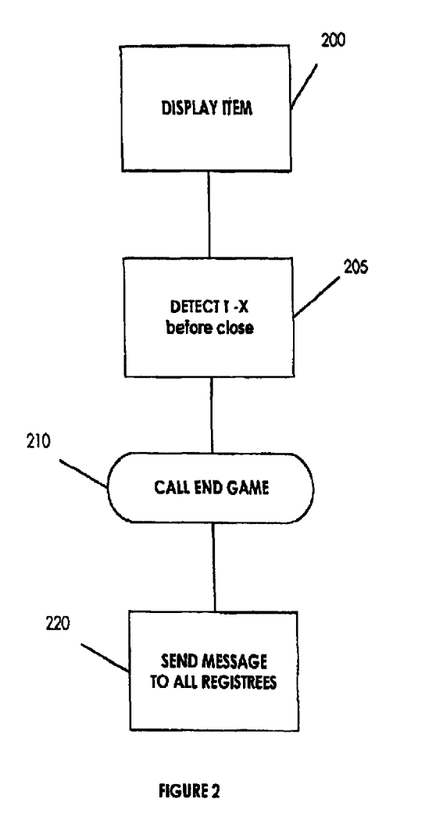
FIG. 2 shows a flowchart of operation according to a first mode.

Server 100 runs the flowchart shown in FIG. 2. The main flowchart runs the beginning part of the auction as a conventional Internet auction, shown generally as step 200. The item to be sold is displayed. It is listed in some kind of index, or under a category. This can be thought of as the advertising part. Using an analogy to a real auction, this is the portion of the auction where the items can be viewed.

In a particularly preferred embodiment, the item is viewed in three dimensions. A picture of the item is shown. The picture of the item can be a two-dimensional picture or a three-dimensional picture. If a three-dimensional picture is used, the system first displays a two-dimensional "splash" of the image while the system is loading the three-dimensional information. The three-dimensional information is then used to enable viewing the item three-dimensionally. This can be done using the techniques described in our application entitled "Touch and Feel on the Internet"; Ser. No. 09/505,646.

In whatever form the item is displayed, this is the period during which the users can see and find the items of interest. As conventional, this portion of the auction also accepts bids, e.g. via a bid agent. A special bid agent can be used as described herein.

This bid form continues until some specified time period (x) before auction close, e.g. one hour prior to auction closing. Step 205 shows detecting that predetermined time, shown as time T-x. The auction mode changes to a mode that indicates the higher energy and interest associated with this portion of the auction. Step 210 shows calling the "end game", which is the routine that runs this higher energy portion of the auction. This changes the auction mode to a more interactive atmosphere.

At step 220, all of the people who have registered for the auction and indicated a desire to participate in the end game are sent a message. This message can be sent in a number of different ways. An e-mail can be sent to each person on the list. Pager numbers can also be contacted to leave an alphanumeric page indicating the URL of the auction site. These two techniques are especially advantageous when the email or page is sent to a cellular phone of a type that allows web browsing. The endgame can be carried out on the cellular phone, by clicking on the URL that is sent.

An automated agent can leave an audio message (voice mail) on a person's normal telephone, indicating that the end game has started.

After an endgame has started, and while still in progress, a user can log into the auction site. The user enters their name and password, as conventional. Upon entering their name and password, the user receives an indication, e.g. via a pop up window with a prompt, that the end game for this auction is in progress. The pop up window can take them directly into the end game environment.

The special agent program used herein takes into account the realities of such a system. Bidding too early in the process can increase the price for an item. Usually the prices in the early part of the auction are kept moderate. The bidding often does not reach levels approximating the actual value until later in the auction.

The previously-used system automatically immediately made its bid based on current bid amount. If two people gave instructions to their systems, those two people would automatically and immediately bid against each other, until one was outbid. Consequently, users often do not place their bids early, to avoid starting such a bidding war.

The present application describes an agent which avoids this issue by using a time profile. The agent allows setting bids, including maximum bids, and also setting times at which those maximum bids will be provided.

Another operation describes a graphical user interface simplifying that operation.

Figure 3:
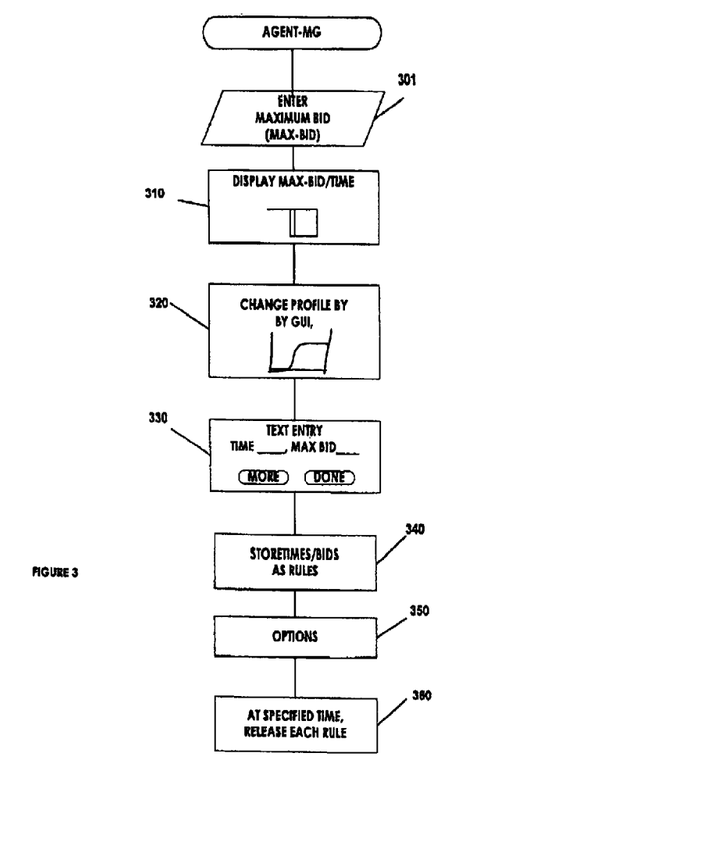
FIG. 3 shows a flowchart of the special "agent" used in this auction system.

The flowchart shown in FIG. 3 represents the agent manager (AGENT_MG).

The user is first prompted for a maximum bid (MAX_BID) at step 301. That maximum bid indicates the maximum that the agent will be authorized to bid on the item. The agent will not bid any amount, however, until authorized to do so.

At step 310, a graphical representation of times and the maximum bid is displayed. The graph can initially show any desired profile of bid vs. time; here it shows the agent being authorized to bid the MAX_BID amount, immediately. This profile, however, can be changed. Step 320 shows one technique in which the graph is edited. The user may, for example, not allow any bids until the end game or allow a very moderate bid initially, and more bids in the end game. The profile as edited in step 320 shows no bids being authorized until a time y. That time y can be determined with precision by resting the cursor over a time, and waiting for a "screen tip" to be displayed. This graphical system can be easily edited on many different platforms, e.g., a cellular phone that allows web browsing.

At any point, instead of using the graphical user interface, the user can select, e.g., right click, on a portion of the line, and use a text entry system. Step 330 shows a textual interface. The user can enter information, e.g., AT TIME t1, ALLOW A MAXIMUM BID OF $x1, where the underlined information is entered.

However entered, the maximum bids and the times at which those maximum bids are allowed to be released, are stored at 340. This information is entered as a function of time, and hence can be stored as rules, for example. A rule might read:

At time AUCTION_END−0:30 (30 minutes before auction end), bid up to $10.

Option entry is carried out at step 350. Options can include:

Overriding previous bids during the end game. This can be important with an agent. If the agent has been instructed to bid up to $20, a later bid may actually bid against the agent's previous bid, and force the agent up to its maximum. This system enables overriding previous bids placed with the agent, in order to allow placing a higher bid. In some instances, that overriding can be allowed, for example, only when a higher bid is desired.

The ability to cancel a previously-entered rule.

Contact information to contact (at step 220) during the end game, and/or a request to enter the end game.

Authorization to automatically raise the bid for a reserve auction.

Other options are possible.

Each of these options are preferably written as rules that drive the automated bidding program.

These rules written by the agent are kept secret until the time they are executed. Each of the rules includes an execute time. For example, for the bid rules shown in step 330, each rule starts with at time $t_1$, do x. The present application contemplates placing multiple different bid/time combinations in this way. For example, a first one could allow bidding up to $x1 at time t−1 hour; and a larger bid of up to $x2 at time t−½ hour.

Prior to this time to execute, the main process running on the server computer cannot obtain the contents of the rule. Only the person who made the rule can read the rule.

After the time $t_1$, the agent will bid up to the maximum amount specified, not placing any bid until the time specified. However, since the time for the rule has passed, the server at that point knows certain information about the contents of the rule, and can use that information as described herein.

Therefore, before the specified times, the rules are absolutely secret. No one except the bidder can find these rules. After the time, the contents of the rules can be known to the server. The disclosure provided herein describes how these bids allow faster bid processing, e.g. bid rejection and the like. Step 360 shows the agent generally carrying out a time processing routine. At the specified time, each rule e.g. bid, is released.

For rules such as reserve handling, the time of release is the auction end.

Figure 4:
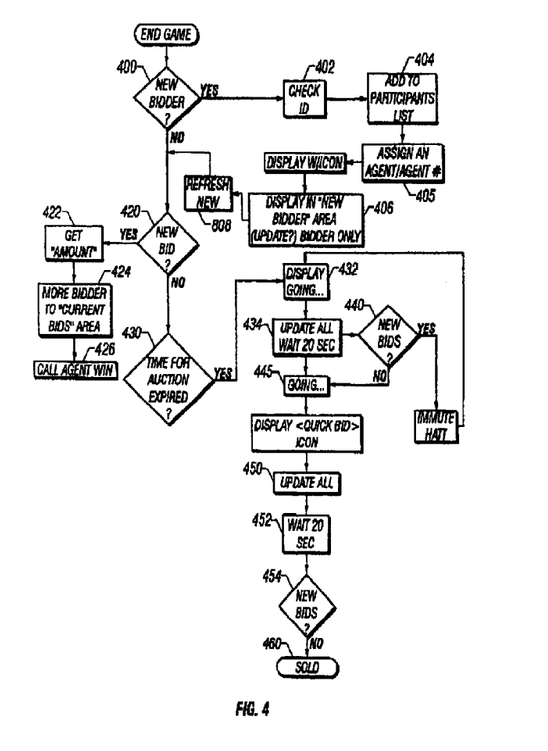
FIG. 4 shows a flowchart of operation of an end game.

As described above, at the specified time, AUCTION_END−x, the end game routine is called, and the auction form changes. The end game is shown in FIG. 4. Step 400 detects a new bidder entering the end game. As described above, this can be done by the bidder signifying their intention to enter the end game, or can be an automatically-created pop up window when a previously-registered user logs in to the auction's website. The flowchart shows verifying the identity of the new bidder at step 402. Once the identity is verified, e.g., by username and password, the user is added to the participants list for the end game at step 404.

Figure 5:
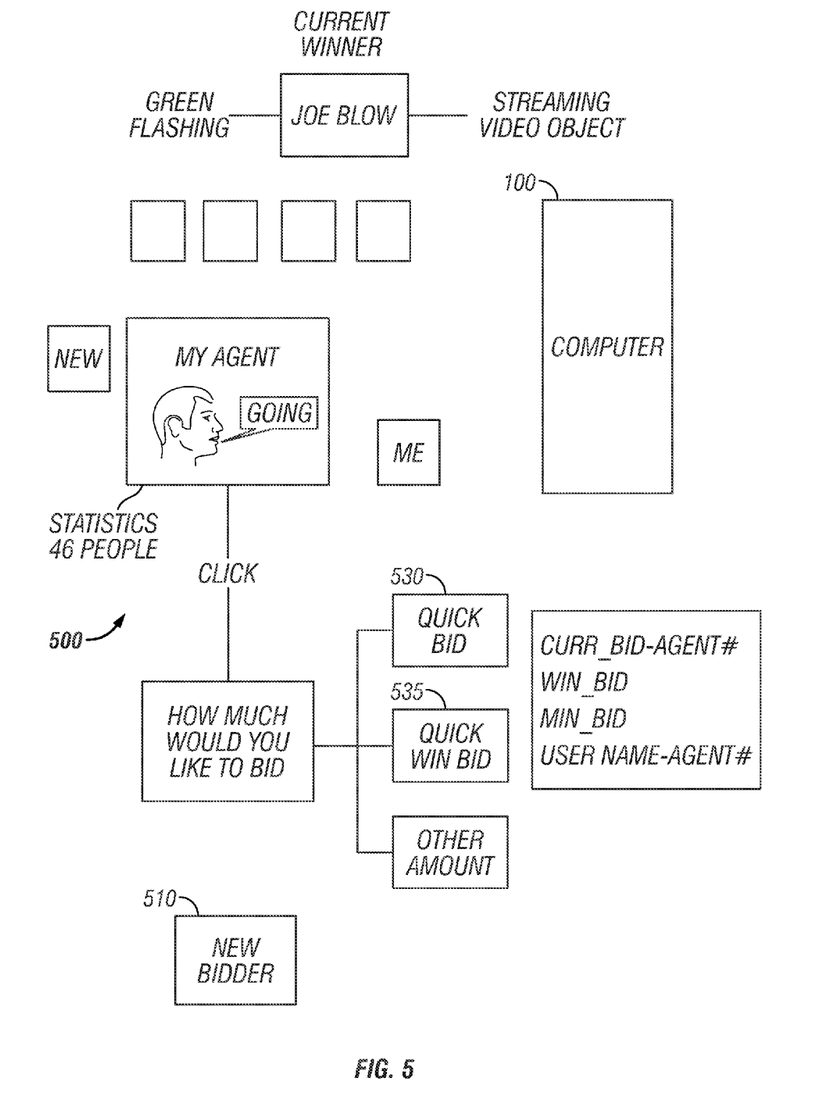
FIG. 5 shows a diagram of the forum showing the multiple users.

The endgame is carried out in a graphical forum. Each user is shown in the forum, along with other users. The forum 500 is shown in FIG. 5. Once the new user has been added at step 404, the user is displayed in the forum, with an icon indicating the user's status. The status can include credit rating or other information. The user is initially displayed in the new bidder area 510. Step 406 illustrates displaying the new user in the new bidder area.

In this embodiment, the user signs in, and thereafter can place bids without entering their name/password. This is different from other online auction paradigms, in which each bid requires the user's name/password. This is more difficult for the user, and also slows down the operation. In this paradigm, a session key can be established after login, so that the communication occurs over a secure channel.

The check ID step of step 402 can be user verification by any means. One such verification is specific to use with a web-browsing cellular telephone. The caller ID of the calling telephone can be established. This establishes the user's identification automatically.

One feature of this real time auction is that the bidders must receive information that is frequently updated. Typical web browsers, however, do not automatically update the information that they display. Accordingly, the present application uses automatic information update to provide up to date information to the bidders.

This automatic information update can be done in different ways. One way is to send an update command to the browser at specified intervals. This update command causes the browser to request a refresh, thereby loading the new and updated forum scene.

In another aspect, certain parts of the image that is displayed by the web browser to represent the forum are defined as being streaming video. Streaming video is well known in the art, and displays a continuous stream of video to the user. A standard streaming video stream can be used.

Another option defines a special object within the web browser environment. This object is effectively stop motion video. At times the object can be changing. When unchanged, the object remains the same. When the object receives information, it changes, without a need to "refresh".

In any case, assuming that the standard web browser is used, a command is sent to the web browser at step 408, requesting at least the new bidder's web browser to refresh. The new bidder sees himself added to the new bidder section 510. Others might not see this addition until some other action causes them to refresh. However, a new bidder being added is not necessarily important to all bidders.

The add to participants list at step 404 includes assigning an agent to the participant at 405, if necessary. The participant may already have an agent assigned from previous participation in the auction during the display mode 200. If so, the user retains that agent. If not, a new agent instance is defined, e.g. by auction number and agent number. The agent is assigned one-to-one with the user so that the user has his own agent. As described above, that agent can keep secrets during the bidding process, even though that agent may be running within the same server that runs many of the other agents.

Also, after the ID is verified at 402, the user name is displayed along with the results of the id check. For example, the system may operate a rating system for users. This rating system may include a credit rating of the user, for instance a maximum bid that the user is authorized to make.

Another rating is based on the user having entered a guarantee of bid. For example, the user may use a credit card as part of the bid/bid profile process. When the bid is accepted and the auction is ended, that credit card is automatically charged for the bid amount.

Another option forces the user to post a bond, and can charge the auction against that bond in case the bid is not satisfied.

Yet another possibility is that other participants rate the one participant, and provide a rating scheme that depends on the number positive and negative comments. This is similar to the rating scheme used by E-bay™. According to all of these systems, the user's name as displayed at step 406 may include an indication of the users rating.

Therefore, the user may be displayed as:
JOE BLOW;
RATING A;
BOND POSTED
until the amount of the bid reaches the amount of the posted bond. After the bid exceeds the posted bond, the display can say:

JOE BLOW;
RATING A;
BOND AMOUNT EXCEEDED
If a credit card is used, the display can say
CREDIT CARD ON FILE.

Another option displays information about the user in color based on the rating. A green rating means that the user has a good credit rating. A blue rating means a guaranteed bid. A red rating may mean that the credit line is exceeded.

At step 420, a new bid is detected. Step 422 obtains the amount of the new bid. At step 424, the bidder who placed the bid is moved to the "current bids" area 520. The AGENT_WIN routine (described herein with reference to FIGS. 6A and 6B) is called at step 426. The current bid amount is fed to this routine to determine if the current bid is a winner, and to take action based thereon.

The agent win routine can be done in one of two different ways shown in FIGS. 6A and 6B. These depend on the way that the system handles bids.

A number of variables are defined associated with the bidding process.

NEW_BID is the amount of a newly-placed bid.

MIN_BID is the minimum amount that needs to be bid to place a bid. This value is related to the current bid (CURR_BID), and the bidding increment (BID_INC).

WIN_BID is the amount that is necessary to win the current auction (until outbid). This value may or may not be known to the local agent.

The local agent is partially resident on the client computer, e.g., as an applet running on the client computer. This is done to allow faster reaction to bids. Preferably at least a part of the agent, runs on the users terminal. This part of agent includes certain numbers which facilitate accepting or rejecting bids. For example, the applet is continually updated with minimum bid amounts and, to the extent possible, with winning bid amounts. During the end game, when the user places a bid, the agent is able to accept or reject the bid substantially immediately. Then the agent can send a specified signal to the mainframe computer that is actually moderating the bid. The specified signal can include an indication that an acceptable bid is following. This can substantially speed the process, since an indication of an acceptable bid can be quickly sent and received by the client computer.

FIG. 6A is executed when the maximum among the released bids are known to all agent applets. The new bid is detected at step 420. All agents are continually updated with MIN_BID, WIN_BID, CURRENT_BID at step 610. At step 612, all the values are updated to all participants.

At step 614, the current bid (CURR_BID) is compared with the value of the winning bid (WIN_BID). If the current bid is found to be less than the winning bid at 614, a message is returned to the user placing the bid, indicating "outbid" at 620. The current bid is also set to the value of new bid at step 625, thereby increasing the new minimum bid (=CURR_BID+BID_INC).

These new variables are sent to the mainframe, and at steps 610/612 are sent to all agents. All agents therefore store the values from which it can be immediately ascertained whether a locally-placed bid will win or not.

If the new bid is greater than the winning bid at step 614, then the new bid becomes a winning bid at step 630. The current bid is set to the value of the winning bid at step 630. Note that the current bid is not set to the new bid, unless the new bid=the winning bid. Instead the agent manager is called as described below. At step 635, the new amount is displayed, and the bidder is moved to the top of the screen showing the forum. The system also sends a global update, to update all users to indicate a new winning bid, and a new order of users. The previously-winning bid is placed to the current bidder's area.

If the new bid is greater than the winning bid at 640, the agent manager is called at 645 to define the bids to be released as a function of time.

FIG. 6B shows the alternative in which the winning bid variable is not known globally to all agents. In this case, a new bid at 420 causes a test to be made at step 650 to determine if the current bid is greater than the minimum bid. If so, the minimum bid is posted to the agent holding the winning bid (AGENT_WINBID) at step 655. AGENT_WINBID determines, from its rules database, if it is authorized to place a bid that is high enough to win at the present time, at step 660. If so, then the current bid and minimum bid variables are appropriately increased at step 665, and a notice of outbid is returned at 670. If AGENT_WINBID is not authorized to bid high enough, then the current bid variable is set to the new value at step 675, and the process returns an indication that the current bidder is now the winner. All variables are updated and sent to the mainframe for sending to all agents. The new bidder's agent also becomes the new AGENT_WINBID at 680. An update is posted globally at 685.

The difference between the two routines is the amount of information held locally. In the FIG. 6A routine, all agents have information allowing them to determine locally whether any bid will win. The do not necessarily display it, but they store the information. They can accept or reject a bid locally.

In the FIG. 6B routine, the agents keep the bids secret. A bid can be posted to the agent holding the bids to determine if there is a winning bid. However, this takes longer to effect.

In both routines, the information is not available at all before the scheduled release time.

Returning to FIG. 4, step 430 illustrates that the time for auction is about to expire. This may happen, for example, at the time of auction expiration or 2-10 minutes before. The first thing that happens at step 432 is the global display of the word "going . . . ". This is like a real auction, where the auctioneer warns the audience with this key word. In this embodiment, the word may be displayed in a balloon coming from the auctioneer's or agent's mouth, as shown in the forum of FIG. 5. An update is sent at 434, so that all users will see this message. Alternatively, a new streaming video object is defined coming from the auctioneer's mouth so that the users see the "going" symbol. At this point, time is of the essence. Another paradigm becomes possible—the quick bid paradigm.

Figure 7A:
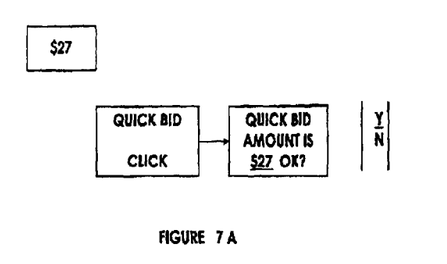
FIGS. 7A and 7B show operation of the quick bid.
Figure 7B:
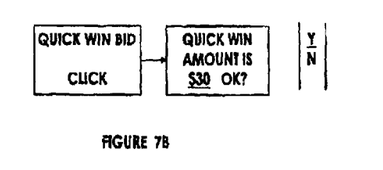
Figure 8A:
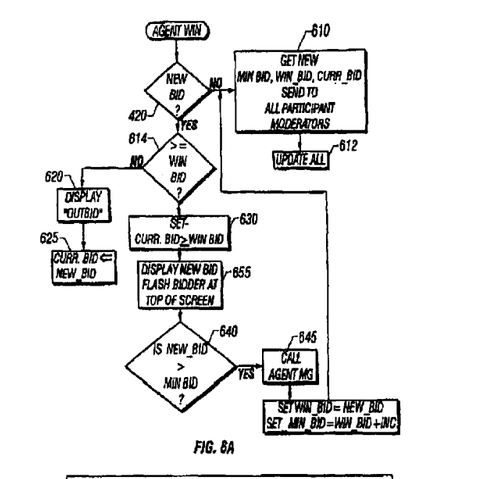
Figure 8B:
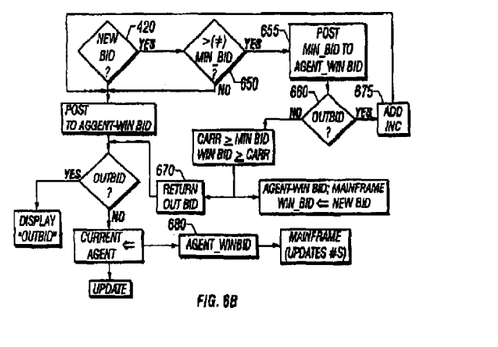

The quick bid is shown in FIGS. 7A and 73. Again there are two modes for the quick bid. In one mode, the agent knows all values. In this case, the agent can enable not only posting a quick bid, but also posting a quick winning bid. The agent in FIG. 5 shows the options for bidding when they are available. For instance, the quick bid 530 may be displayed as shown in FIG. 5, along with the quick winning bid 535. Passing the cursor over either value displays a "screen tip" that allows the user to view what the quick bid or quick winning bid amount will be. Since these values are known to the agent, they are stored in the local browser, and can be displayed quickly. The quick win bid may be displayed or not displayed, depending on rules, options and circumstances of the auction. In one mode of operation, users are provided with an incentive to share the winning bid with others. For instance, users may get a discount or other incentive to allow the quick bid to be known. Even if the quick bid quick win is known, it may only be allowed during the going, going, gone, during which time emotions become higher.

The quick winning bid is also shown in FIG. 7B. In either case, when the user clicks on the amount, they receive an instantaneous indication of the amount they have bid and a confirmation. By clicking yes, the bid is instantly posted, hence stopping the going, going, gone process for at least one minute as illustrated in step 440. After no further bids have been received, the moderator once again enunciates the going (step 432), beginning the end of the process. This can enable the quick bids as described above.

In a normal auction, enunciating the first word "going" would be quickly followed by another going. However, in this auction, the system must allow time for users to get their bids in over the Internet. Hence, preferably at least thirty to sixty seconds elapse prior to the second going at 445. After each instance of going, a global update is sent at 450 or the going going gone is displayed in streaming video. After additional time has elapsed at step 452, without additional bids being detected at 454, the item is indicated as sold at 460.

Other embodiments are contemplated. For example, while the present application describes doing this operation on the Internet, the same operation could be applied to any remote information server or network. The present technique refers to an auction, where the term auction is intended to include any forum in which bids can be placed, one bid which is higher than the bid before it, excluding other bids which may be lower. However, a "dutch auction" in which multiple highest bidders obtain the information, is also contemplated. The present application describes a few different ways of automatically updating the remote servers. It should be understood that other techniques of automatic update of the remote servers are also possible. In addition, the present application contemplates in some circumstances that some but not all of the remote servers will be updated.

All such modifications are intended to be encompassed within the following claims, in which:

The invention claimed is:

1. A method, comprising:
    using a server computer for hosting an Internet-based auction of items for sale;
    in the server computer, requiring a user to the Internet-based auction to establish credit information in the auction, and storing said credit information in the server computer, wherein said establishing credit information comprises using a caller ID of the user to establish information about the user; and
    using the server computer for displaying information to other users in the auction about said user, wherein at least one item that is displayed includes said credit information about the user.

2. A method as in claim 1, wherein said credit information includes a credit rating and where said server computer displays said credit rating to other users.

3. A method as in claim 1, wherein said credit information comprises a maximum bid that a user is authorized to make.

4. A method as in claim 1, wherein said credit information includes a guarantee of bid amount.

5. A method as in claim 1, wherein said credit information includes a bond that is posted, and the information that is displayed is indicative of an amount of the bond that has been posted.

6. A method as in claim 1, wherein said credit information is displayed as a color, where a first color represents a good credit rating for a bid, and a second color indicates a bad credit rating for the bid.

7. A method as in claim 6, wherein said bad credit rating indicates that a credit line that has previously been established is exceeded.

8. A method as in claim 6, further comprising a third color that is displayed, wherein said third color represents that a bid amount is guaranteed.

* * * * *